United States Patent Office 2,704,121
Patented Mar. 15, 1955

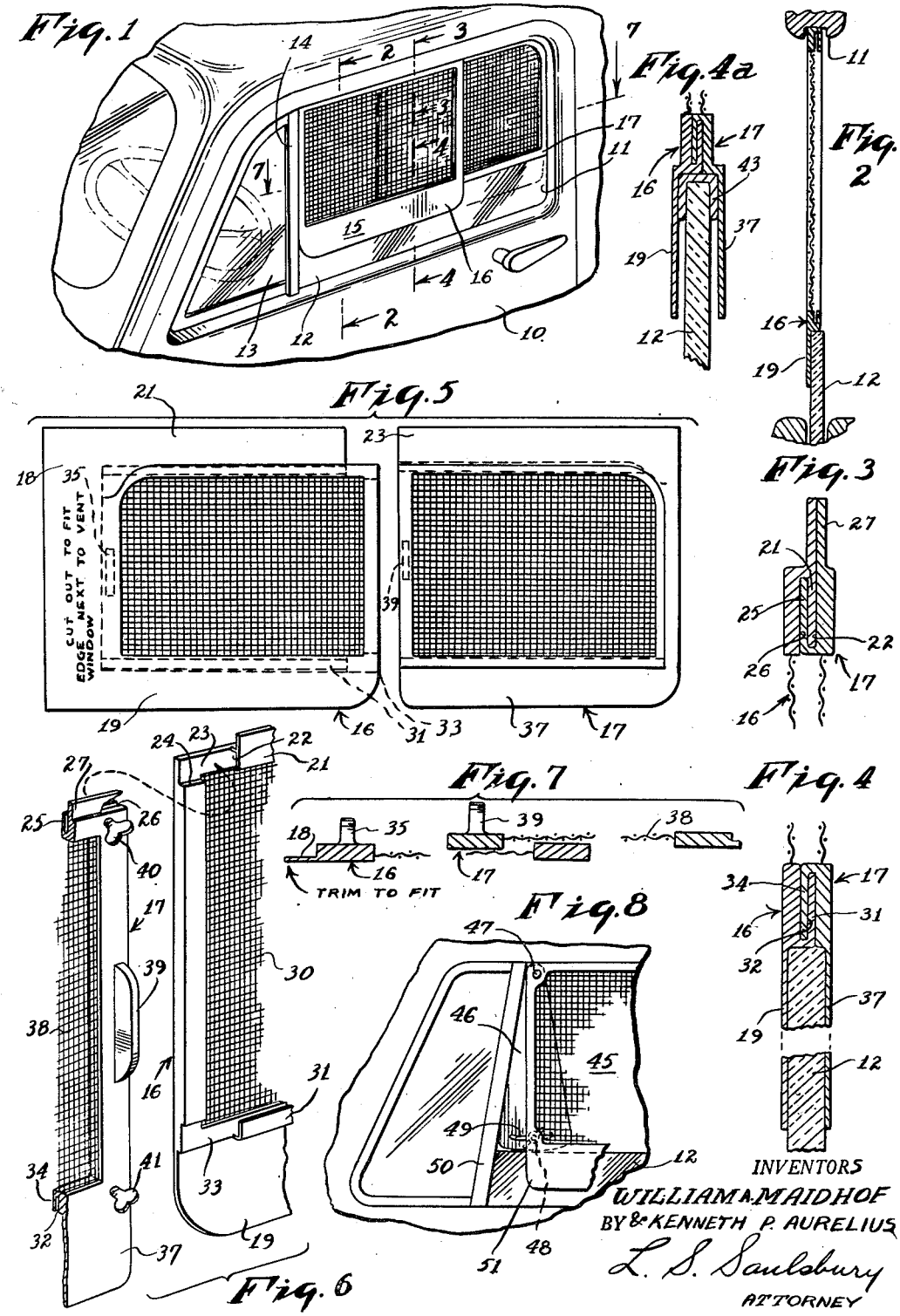

2,704,121

SLIDE SCREEN FOR AUTOMOBILE WINDOWS

William A. Maidhof, Mount Vernon, and Kenneth P. Aurelius, Bronx, N. Y.

Application May 21, 1953, Serial No. 356,476

4 Claims. (Cl. 160—216)

This invention relates to an adjustable slide screen for automobiles.

It is an object of the present invention to provide an adjustable slide screen adapted to fit in the window openings of automobile doors and be secured thereto by the adjustment of the window itself against the lower edge of the screen to urge the screen to the top of the window and wherein the lower edge of the screen has depending sheet metal portions so that the screen can be adapted to a window of any height without losing the screening effect through the opening.

It is another object of the invention to provide a slide screen adapted for use in automobile windows wherein the screen can be adapted to windows having different forward contours or inclinations by cutting or trimming the end of one of the slide screens or by the pivotal adjustment of an auxiliary sheet to render to the screen an inclined attaching edge beyond its regular straight edge.

It is another object of the invention to provide an adjustable slide screen for automobile windows which will fit the same without changing the design of the automobile and installed simply by lowering the window and inserting the screen and thereafter raising the window to cause the screen to be forced into the upper groove of the window opening and to be fixed over the upper edge of the window.

Other objects of the invention are to provide an adjustable slide screen which is of simple construction, inexpensive to manufacture, has a minimum number of parts, may have one of its parts interchangeable with other parts of slightly different shape in order that the screen may be adapted to fit different automobiles and different shaped window openings, where the sides and top of the screen are completely self-contained in the window channel or groove and rigidly retained against rattle while the car is being driven over the road, durable, compact and consumes little space upon being stored, easy to disassemble and remove from the window and efficient in use.

For other objects and for a better understanding of the invention reference may be had to the following detailed description taken in connection with the accompanying drawing, in which:

Figure 1 is a perspective view of the adjustable window screen applied to the window opening of the front door of an automobile;

Fig. 2 is an enlarged vertical sectional view taken on line 2—2 of Fig. 1;

Fig. 3 is an enlarged sectional view taken on line 3—3 of Fig. 1 and through the upper edge of the screen;

Fig. 4 is a vertical sectional view taken on line 4—4 of Fig. 1 and through the lower edge of the screen with the depending guide portions overlying the upper edge of the vertically adjustable window glass;

Fig. 4a is a fragmentary sectional view similar to Fig. 4 showing the screen fitted over beading of the adjustable window glass;

Fig. 5 is a collective view of the two parts of the screen separated from one another;

Fig. 6 is a fragmentary, collective and perspective view of the edges of the two parts of the screen and showing the manner in which they are joined to each other and with thumb screws for retaining them in their adjusted positions;

Fig. 7 is a transverse broken sectional and collective view of the adjustable screen as viewed generally on line 7—7 of Fig. 1;

Fig. 8 is an elevational view of a screen constructed according to a modified form of the invention wherein an adjustable auxiliary member is pivotally connected to the end of the screen part in order that the screen can be accommodated to an inclined forward channel.

Referring now to the figures, 10 represents an automobile door having a channeled opening 11 with a window glass 12 vertically slidable therein. In the forward part of the window opening is a pivotable ventilator glass 13 and a vertical post 14 providing a slide groove for the forward edge of the vertically adjustable window glass 12. Into this window opening 11 there may be fitted and inserted adjustable slide screen 15 embodying the features of the present invention.

This slide screen 15 comprises slidably fitted parts 16 and 17 that can be adjusted relative to each other and shaped and fitted into the window opening to span the width thereof and also substantially fill the vertical extent of the opening.

The screen part 16 may be formed of sheet metal or plastic and is provided with a thin and wide forward edge portion 18 which can be cut and trimmed to fit the forward edge of the opening. With the window opening of the front door having the vertical post 14, the edge portion 18 will be trimmed or cut according to the arrangement of the vertical post 14. If the vertical post is inclined as shown in Fig. 8, the edge portion will be cut accordingly. If the edge portion 18 is to fit in a rounded corner of a window, it can be cut and trimmed to fit such corner.

This screen part 16 has a depending portion adapted to accommodate the upper edge of the window glass 12 and to extend a substantial distance downwardly over the front face thereof. This depending portion 19 gives extra height to the screen and at the same time provides a good sealing connection with the glass.

The upper edge of the screen part 16 has a guide portion 21 providing a groove 22 thereunder. The guide portion 21 terminates short of the connecting edge of the screen part 16 with the screen part 17 to provide a recess 23 into which the edge of the screen part 17 can be placed to start the sliding engagement of the screen part 17 with the screen part 16. The vertical edge of the screen part 16 is shouldered at 24 to support outwardly extending lip portion 25 on the upper edge of the screen part 17 which is adapted to extend into slot 22 under the guide portion 21 of the screen part 16. The guide portion 21 will depend into groove 26 under the lip 25. The upper edge of the slide part 17 has an upstanding portion 27 that engages with the upper end of the guide portion 21 of the part 16 in a flush manner and the two together will be fitted into the top groove of the window opening 11 whereby to hold the upper edge of the screen firmly against lateral displacement within the window opening.

Screen material 30 occupies the greater area of the screen part 16 and adjacent the lower edge thereof is an inwardly and upwardly extending guide portion 31 that will fit into slot 32 on the part 17. This guide lip 31 terminates short of the vertical edge of the screen part 16 to provide a starting recess 33 for the edge of the lip 34 of screen part 17 as the two screen parts are brought together. This screen part 16 has a handle 35 adjacent the trim portion 18.

The screen part 17 has a depending portion 37 adapted to lie along the inner face of the window glass 12 so that as the screen parts are joined together, the depending portions 19 and 37 of these parts will adequately and firmly hold the lower edge of the slide screen upon the window edge and without any tendency for the same to slide laterally therefrom.

The screen part 17 has screen material 38 and a handle 39 for operating the inner screen. The two handles 35 and 39 can be grasped to hold and pull the slide screens together for removal thereof or can be extended. A thumb screw 40 is provided at the upper edge of the screen part 17 and a thumb screw 41 is provided at the lower portion of the screen part 17 and when tightened will prevent sliding movement of the screen parts relative to each other. These thumb screws 40 and 41 will respectively engage with the upper and lower guide portions 21 and 31.

As shown in Fig. 4, it will be noted that the depending portions 19 and 37 of the respective screen parts will lie flush with the opposite faces of the window glass 12. If the window glass 12, as shown in Fig. 4a, has a rubber bead 43 extending along the upper edge of the same, the depending portions 19 and 17 will extend downwardly over the sides of the beading strip 43.

In Fig. 8, there is shown a modified form of the invention, wherein a screen part 45 has its upper and lower edges formed similar to the edges of the screen part 16, but is without the trim portion 18 at its forward edge. Instead of trim portion 18 there is provided an auxiliary swing portion 46 pivoted at the upper edge of the screen part as indicated at 47 and retained by a clamping bolt means 48 operable in an arcuate slot 49 on the lower end of the auxiliary part 46. Where an inclined vertical post 50 is provided in the window opening, an adjustment can be made of the swing part 46 to fully close the opening overlying the window glass 12. The edge of this swing part 46 will enter the groove in the side of the vertical post 50. The screen part 45 will have a depending portion 51 that will overlie the front face of the glass 12. The clamp bolt means 48 lies on the inside of the screen so that the adjustment of the swing part 46 can be made from the inside. The screen part 45 can cooperate with the inner screen part 17.

It will thus be seen that provision is made on the screen parts 16 and 45 so that the screen part can be made to accommodate the vertical edge of the window opening. It will also be apparent that the screen parts can be turned about for the window and the portion 18 trimmed or cut to conform to the rear edge of a window opening.

It will also be apparent that the screen parts once the window glass 12 has been elevated into the space between the depending portions 19 and 37 or 51 and 37 that the screen will be firmly held in the window opening 11. The edges of the screen parts will enter the grooves of the window openings.

While various changes may be made in the detail construction, it shall be understood that such changes shall be made within the spirit and scope of the present invention as defined by the appended claims.

What is claimed:

1. A slide screen for automobile window openings comprising screen parts slidably fitted upon one another and an auxiliary closure part pivotally connected to the upper portion of one of the screen parts and adjustable outwardly therefrom for engagement with an inclined vertical post lying within the automobile window opening and means for holding the swing part in its adjusted position.

2. An adjustable slide screen for automobile window openings comprising screen parts, one of said screen parts having along its upper and lower edges guide portions terminating short of one edge of the screen part to provide starting recesses, the other screen part having groove and guide portions respectively enterable into the starting recesses and connectable with the upper and lower guide portions of the one screen part respectively whereby to provide a sliding fit with one another.

3. An adjustable slide screen for automobile window openings comprising screen parts, one of said screen parts having along its upper and lower edges guide portions terminating short of one edge of the screen part to provide starting recesses, the other screen part having groove and guide portions respectively enterable into the starting recesses and connectable with the upper and lower guide portions of the one screen part respectively whereby to provide a sliding fit with one another, and depending portions on the lower edges of the screen parts adapted to overlie the faces of the window glass slidable within the window opening.

4. An adjustable slide screen for automobile window openings comprising screen parts, one of said screen parts having along its upper and lower edges guide portions terminating short of one edge of the screen part to provide starting recesses, the other screen part having groove and guide portions respectively enterable into the starting recesses and connectable with the upper and lower guide portions of the one screen part respectively whereby to provide a sliding fit with one another, depending portions on the lower edges of the screen parts adapted to overlie the faces of the window glass slidable within the window opening, the upper edges of the guide portions of the respective screen parts having portions engaging flush with one another and adapted to enter the groove in the top of the window opening, and one of the screen parts having a laterally extending trim portion adapted to be cut to conform to the shape of the one vertical edge of the window opening.

References Cited in the file of this patent

UNITED STATES PATENTS

| Number | Name | Date |
|---|---|---|
| 266,246 | Willer | Oct. 17, 1882 |
| 1,545,278 | Rachlin | July 7, 1925 |
| 2,307,477 | Wilber | Jan. 5, 1943 |